(12) United States Patent
McCaffrey (10) Patent No.: US 10,697,321 B2
(45) Date of Patent: Jun. 30, 2020

(54) VENTED TANGENTIAL ON-BOARD INJECTOR FOR A GAS TURBINE ENGINE

(71) Applicant: United Technologies Corporation, Farmington, CT (US)

(72) Inventor: Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 184 days.

(21) Appl. No.: 15/913,269

(22) Filed: Mar. 6, 2018

(65) Prior Publication Data

US 2018/0195410 A1 Jul. 12, 2018

Related U.S. Application Data

(62) Division of application No. 14/609,926, filed on Jan. 30, 2015, now Pat. No. 9,945,248.

(60) Provisional application No. 61/973,338, filed on Apr. 1, 2014.

(51) Int. Cl.
| | |
|---|---|
| *F01D 25/12* | (2006.01) |
| *F01D 1/02* | (2006.01) |
| *F01D 5/08* | (2006.01) |
| *F01D 11/00* | (2006.01) |
| *F01D 11/02* | (2006.01) |
| *F02C 7/18* | (2006.01) |

(52) U.S. Cl.
CPC .............. *F01D 25/12* (2013.01); *F01D 1/02* (2013.01); *F01D 5/081* (2013.01); *F01D 5/087* (2013.01); *F01D 11/001* (2013.01); *F01D 11/02* (2013.01); *F01D 11/025* (2013.01); *F02C 7/18* (2013.01); *F05D 2260/14* (2013.01); *F05D 2260/601* (2013.01); *F05D 2260/6022* (2013.01); *Y02T 50/673* (2013.01); *Y02T 50/676* (2013.01)

(58) Field of Classification Search
CPC .......... F01D 25/12; F01D 5/081; F01D 5/082; F01D 11/001; F01D 11/02; F01D 11/025; F01D 5/087; F01D 1/02; F02C 7/18; Y02T 50/676; F05D 2260/6022; F05D 2260/601; F05D 2260/14
USPC .......................... 415/115, 144, 176; 239/600
See application file for complete search history.

(56) References Cited

U.S. PATENT DOCUMENTS

| | | |
|---|---|---|
| 4,526,511 A | 7/1985 | Levine |
| 4,822,244 A | 4/1989 | Maier et al. |
| 4,872,810 A | 10/1989 | Brown et al. |

(Continued)

FOREIGN PATENT DOCUMENTS

| | | |
|---|---|---|
| EP | 0785338 A1 | 7/1997 |
| EP | 0789133 A1 | 8/1997 |

(Continued)

*Primary Examiner* — Michael R Reid
(74) *Attorney, Agent, or Firm* — Bachman & LaPointe, P.C.

(57) ABSTRACT

An on-board injector that delivers discharge air toward a turbine rotor of a gas turbine engine includes a second wall spaced form a first wall to define an annular inlet about an engine longitudinal axis and a multiple of airfoil shapes between the first wall and the second wall to segregate discharge air from the annular inlet, and a multiple of bypass apertures each along a radial axis transverse to the engine longitudinal axis through each of the multiple of airfoil shapes and the respective first wall, the second wall.

7 Claims, 7 Drawing Sheets

(56) References Cited

U.S. PATENT DOCUMENTS

| | | |
|---|---|---|
| 5,207,560 A | 5/1993 | Urban |
| 5,245,821 A | 9/1993 | Thomas, Jr. et al. |
| 5,314,303 A | 5/1994 | Charbonnel et al. |
| 5,316,437 A | 5/1994 | Czachor |
| 5,402,636 A | 4/1995 | Mize et al. |
| 5,639,210 A | 6/1997 | Carpenter et al. |
| 5,800,125 A | 9/1998 | Largillier et al. |
| 5,816,776 A | 10/1998 | Chambon et al. |
| 6,183,193 B1 | 2/2001 | Glasspoole et al. |
| 6,227,801 B1 | 5/2001 | Liu |
| 6,382,905 B1 | 5/2002 | Czachor et al. |
| 6,722,138 B2 | 4/2004 | Soechting et al. |
| 6,773,225 B2 | 8/2004 | Yuri et al. |
| 6,787,947 B2 | 9/2004 | Coulon et al. |
| 6,837,676 B2 | 1/2005 | Yuri et al. |
| 7,048,497 B2 | 5/2006 | Arilla et al. |
| 7,094,029 B2 | 8/2006 | Taylor et al. |
| 7,210,899 B2 | 5/2007 | Wilson, Jr. |
| 7,841,187 B2 | 11/2010 | Behaghel et al. |
| 8,011,883 B2 | 9/2011 | Schwarz et al. |
| 8,342,798 B2 | 1/2013 | Floyd, II et al. |
| 8,381,533 B2 | 2/2013 | Smoke et al. |
| 9,945,248 B2 * | 4/2018 | McCaffrey .............. F01D 5/081 |
| 2012/0167595 A1 | 7/2012 | Ottow et al. |
| 2012/0275898 A1 | 11/2012 | McCaffrey et al. |

FOREIGN PATENT DOCUMENTS

| | | |
|---|---|---|
| EP | 1367221 A1 | 12/2003 |
| WO | 03040524 A1 | 5/2003 |

* cited by examiner

VENTED TANGENTIAL ON-BOARD INJECTOR FOR A GAS TURBINE ENGINE

CROSS REFERENCE TO RELATED APPLICATION

This application is a divisional of U.S. patent application Ser. No. 14/609,926, filed Jan. 30, 2015, which claims the benefit of provisional application Ser. No. 61/973,338, filed Apr. 1, 2014, which are also incorporated herein by reference.

STATEMENT REGARDING FEDERALLY SPONSORED RESEARCH OR DEVELOPMENT

This disclosure was made with Government support under FA8650-09-D-2923-AETD awarded by The United States Air Force. The Government has certain rights in this disclosure.

BACKGROUND

The present disclosure relates to a gas turbine engine and, more particularly, to Tangential On-Board Injectors.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases. The hot gases expanded within the turbine section produce a gas stream across alternating rows of stationary turbine stator vanes and rotating turbine rotor blades produce power.

Internal secondary flow systems transfer cooling air that bypasses the combustor section to a turbine rotor assembly for subsequent distribution to the interior of the rotor blades through a tangential on-board injector (TOBI). Accelerating the cooling air through a nozzle, and swirling the air with the rotation of the turbine rotor, reduces the temperature of the cooling air as it is injected on board the turbine rotor.

The volume and direction of the cooling air are features of the secondary flow system effectiveness and overall engine performance. The secondary flow system should provide a desired metered amount of cooling air as additional cooling air will penalize efficiency of the engine, while too little cooling air may result in overheating of the rotating turbine disks, blades, and seals Additionally, the secondary flow system directs purge air within the engine to prevent hot gas ingestion in the turbine rim cavities. Typically, rotating Knife Edge (K/E) seals, in conjunction with honeycomb seal lands, are used to control the amount of purge mass flow needed to seal and purge cavities. Other seals such as brush seals and contact seals can be used for this purpose with varying sealing effectiveness; however a certain amount of purge mass flow is required to properly protect the turbine rotor from hot-gas ingestion at the rim cavities. Heat pickup due to passage heat conduction/convection, rotor cooling, and windage losses due to the rotation effects of the disks and rotating seals, increases the temperature of the purge flow as it passes through the engine. It is desirable to use this heated purge air to satisfy the rim cavity mass flow requirement, as its cooling effectiveness has been greatly reduced and no longer has ability to do further rotor/blade cooling.

The temperature of blade cooling air is negatively affected by the undesirable mixing of the cooling air with the purge air, which is air that flows past the various seals and cavities within the gas turbine engine towards the TOBI. When air exits the TOBI, the flow does not purely flow into the rotor/blade as rotor cavity purge air must flow across the TOBI discharge stream. The crossing flows mix, and pollutes the TOBI flow. The net result is the air flowing to the blade may be relatively hotter and thereby relatively less thermally efficient.

SUMMARY

An on-board injector that delivers discharge air toward a turbine rotor of a gas turbine engine according to one disclosed non-limiting embodiment of the present disclosure includes a first wall; a second wall spaced from the first wall to define an annular inlet about an engine axis; and a multiple of airfoil shapes between the first wall and the second wall to segregate discharge air from the annular inlet, and a multiple of bypass apertures each along an axis transverse to the engine axis through each of the multiple of airfoil shapes and the respective first and second wall.

A further embodiment of the present disclosure includes, wherein the multiple of airfoil shapes include a trailing edge arranged about 80 degrees to an engine axis.

A further embodiment of any of the foregoing embodiments of the present disclosure includes, wherein the multiple of airfoil shapes include a trailing edge arranged about 10 degrees to circumferential.

A further embodiment of any of the foregoing embodiments of the present disclosure includes, wherein the multiple of airfoil shapes define a cascade exit to segregate the discharge air.

A further embodiment of any of the foregoing embodiments of the present disclosure includes, wherein each the multiple of airfoil shapes include a pressure side and a suction side, the pressure side in a rotational downstream position with respect to a coverplate about the engine axis.

A further embodiment of any of the foregoing embodiments of the present disclosure includes, wherein the first wall includes a first wall portion with a multiple of apertures.

A further embodiment of any of the foregoing embodiments of the present disclosure includes, an outer rim that extends from the portion.

A further embodiment of any of the foregoing embodiments of the present disclosure includes, a static seal that extends radially inward from the outer rim that extends from the radial portion.

A further embodiment of any of the foregoing embodiments of the present disclosure includes a knife edge that extends from the coverplate to seal with the static seal.

A further embodiment of any of the foregoing embodiments of the present disclosure includes, wherein the outer rim, the radial first wall portion and the first wall define a generally U-shape in cross-section.

A further embodiment of any of the foregoing embodiments of the present disclosure includes, wherein the coverplate includes a multiple of coverplate apertures to receive the discharge air.

A further embodiment of any of the foregoing embodiments of the present disclosure includes, wherein the second wall includes an extended portion with a multiple of apertures.

A further embodiment of any of the foregoing embodiments of the present disclosure includes, wherein the multiple of bypass apertures are circular.

A gas turbine engine according to another disclosed non-limiting embodiment of the present disclosure includes a coverplate for a turbine rotor defined about an engine longitudinal axis, the coverplate including a multiple of coverplate apertures; and an on-board injector with a multiple of airfoil shapes between a first wall and a second wall to define an annular inlet about the engine longitudinal axis, the multiple of airfoil shapes operable to segregate and direct discharge air from the annular inlet toward the multiple of coverplate apertures, the on-board injector including a multiple of bypass apertures each along a radial axis transverse to the engine longitudinal axis and through each of the multiple of airfoil shapes, the first wall, and the second wall.

A further embodiment of any of the foregoing embodiments of the present disclosure includes, wherein the on-board injector is a radial on board injector.

A further embodiment of any of the foregoing embodiments of the present disclosure includes, wherein the on-board injector is an angled on board injector.

A further embodiment of any of the foregoing embodiments of the present disclosure includes, wherein each the multiple of airfoil shapes include a pressure side and a suction side, the pressure side in a rotational downstream position with respect to a coverplate about the engine axis.

A further embodiment of any of the foregoing embodiments of the present disclosure includes, wherein the multiple of airfoil shapes define a cascade exit to segregate the discharge air.

A method of managing purge air within a turbo machine according to another disclosed non-limiting embodiment of the present disclosure includes a segregating discharge air from an annular inlet with a multiple of airfoil shapes, the annular inlet defined around an engine longitudinal axis; and directing purge air through a multiple of bypass apertures each along a radial axis transverse to the engine longitudinal axis and through each of the multiple of airfoil shapes.

A further embodiment of any of the foregoing embodiments of the present disclosure includes, tangentially directing the discharge air.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
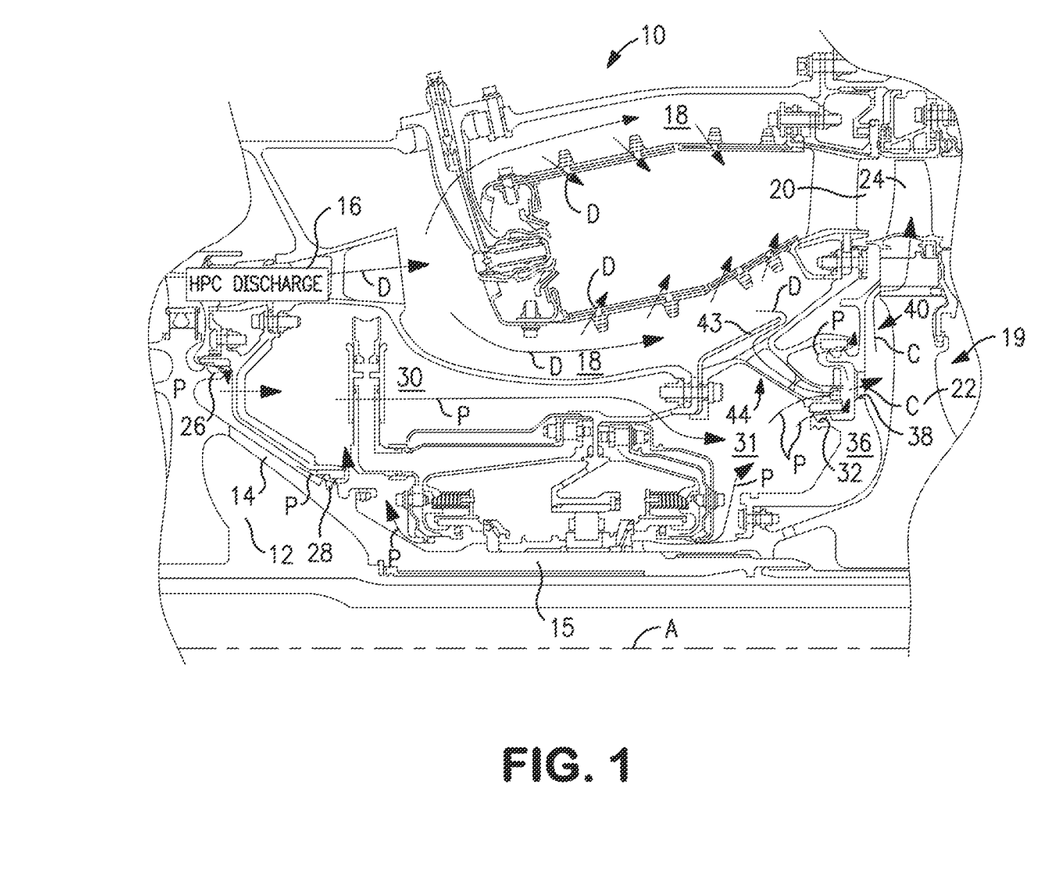
FIG. 1 is a fragmentary axial cross section of a portion of the turbine section of a gas turbine engine showing a tangential on-board injector (TOBI) nozzle for the distribution of cooling air.

FIG. 1 schematically illustrates a portion of a gas turbine engine 10. Although depicted as a turbofan in the disclosed non-limiting embodiment, it should be appreciated that the concepts described herein are not limited to use with turbofans as the teachings may be applied to other types of turbo machines.

The gas turbine engine 10 generally includes a compressor section 12 and a turbine section 19 mounted on a rotor shaft 15 to form a spool that rotates about an engine longitudinal axis A. In this disclosed non-limiting embodiment, the turbine 19 is a high pressure turbine. The compressor 12 includes a hub 14 mounted to the rotor shaft 15. A discharge outlet 16 expels discharge air D from the compressor 12 to a turbine inlet 20 via passages 18. A turbine rotor hub 22 that supports rotor blades 24 is mounted on the shaft 15. The blades 24 receive and expand the discharge air D from the turbine inlet 20.

Purge air P flow is produced within the compressor section 12, and directed to the turbine section 19 through a series of passages. For example, compressor seals 26 and 28 arranged between the hub 14 and engine housing may leak purge air P into cavities 30 and 31. The purge air P then leaks past seal 32 and reaches the turbine 19.

An on-board injector 44 which, in this disclosed non-limiting embodiment, is a tangential on-board injector (TOBI) delivers discharge air D to a space 40 near the turbine 16 for cooling the turbine rotor hub 22. A baffle 43 may be arranged between the passage 18 and the on-board injector 44 to turn the air abruptly to separate debris before communication to the turbine 19. The on-board injector 44 is generally parallel to the engine longitudinal axis A.

A coverplate 36 separates the on-board injector 44 and the turbine rotor hub 22. A multiple of coverplate apertures 38 are provided in the coverplate 36 to direct cooling air C from the on-board injector 44 to be directed into the turbine rotor hub 22.

Figure 2:
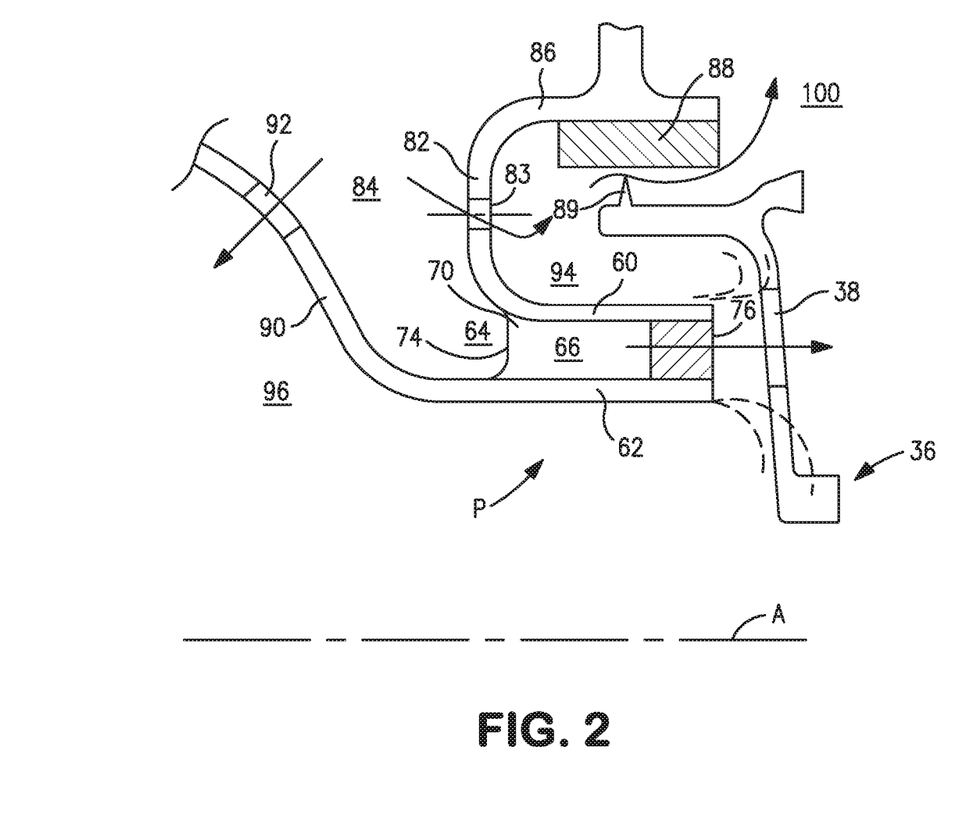
FIG. 2 is an enlarged axial cross section view of a tangential on-board injector (TOBI) used to distribute discharge air for cooling the turbine taken along line 2-2 in FIG. 3.
Figure 3:
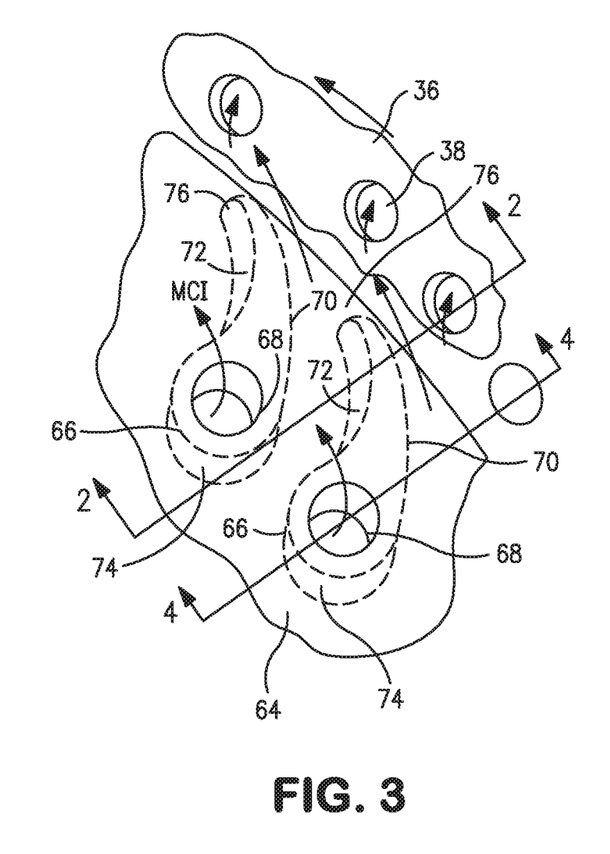
FIG. 3 is a partially broken perspective view of the TOBI from an annular inlet perspective.

With reference to FIG. 2, the on-board injector 44 generally includes a first wall 60, a second wall 62 spaced from the first wall to define an annular inlet 64 about the engine longitudinal axis A, and a multiple of airfoil shapes 66 between the first wall 60 and the second wall 62 to segregate discharge air from the annular inlet 64 (also shown in FIG. 3). The first and second wall 60, 62 are annular walls defined about the engine axis A. It should be appreciated that the on-board injector 44 may be manufactured of separate assembled components or integrally manufactured such as via an additive manufacturing process.

Each of the multiple of airfoil shapes 66 include a respective bypass aperture 68 each along a radial axis B (FIG. 4) transverse to the engine longitudinal axis A and the respective first and second wall 60, 62. Each of the multiple of airfoil shapes 66 includes a first sidewall 70 that may be convex and defines a suction side, and a second sidewall 72 that may be concave and define a pressure side. Sidewalls 70, 72 are joined at a leading edge 74 and at an axially spaced trailing edge 76. More specifically, each airfoil trailing edge 76 is spaced chordwise and downstream from the airfoil leading edge 74 to segregate the discharge air from the annular inlet 64 though a cascade exit 80 (FIG. 5). That is, the cascade exit 80 is defined by the sidewalls 70, 72 which separate the initially annular flow into the annular inlet 64 such that the pressure side is in a rotational downstream position with respect to the coverplate 36 about the engine longitudinal axis A.

The sidewalls 70, 72 extend radially between the first and second wall 60, 62 to segregate the discharge air from the annular inlet 64 and turn the discharge air in a tangential direction coordinated with a rotational direction of the coverplate 36 and the turbine rotor hub 22. In one disclosed non-limiting embodiment, each trailing edge 76 is arranged about 80 degrees to axial. In another disclosed non-limiting embodiment, each trailing edge 76 is arranged about 10 degrees to circumferential.

The first wall 60 further includes a radial first wall portion 82 with a multiple of apertures 83 in communication with a cooling air supply cavity 84. The radial first wall portion 82 extends into an outer rim portion 86 operable to support a static seal 88. The static seal 88 extends radially inward from the outer rim portion 86 to interface with a knife edge 89 that extends from the coverplate 36. That is, the outer rim portion 86, the radial first wall portion 82 and the first wall portion 60 defines a generally U-shape in cross-section.

The second wall 62 includes an extended portion 90 with a multiple of apertures 92 in communication with the cooling air supply cavity 84. The apertures 83, 92 are optional and may facilitate, for example, mass flow distribution between the cooling air supply cavity 84, an outer rim sealing cavity 94, and an inner turbine rotor purge cavity 96. The mass flow through aperture 83 is preferably zero. The mass flow through aperture 92 is minimized with the combined flow from aperture 92 and the purge mass flow P substantially equal to the mass flow required for purging an outermost rim cavity 100.

Figure 4:
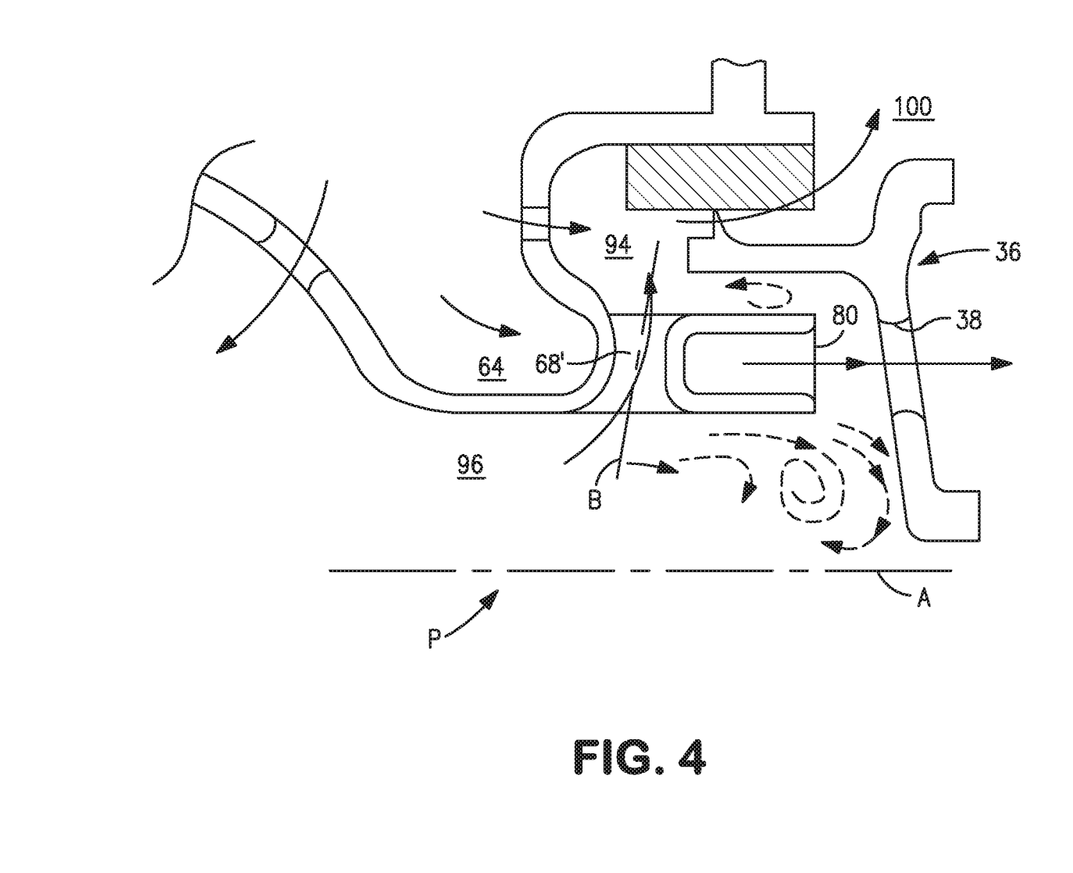
FIG. 4 is an enlarged axial cross section view of a tangential on-board injector (TOBI) used to distribute discharge air for cooling the turbine taken along line 4-4 in FIG. 5.
Figure 5:
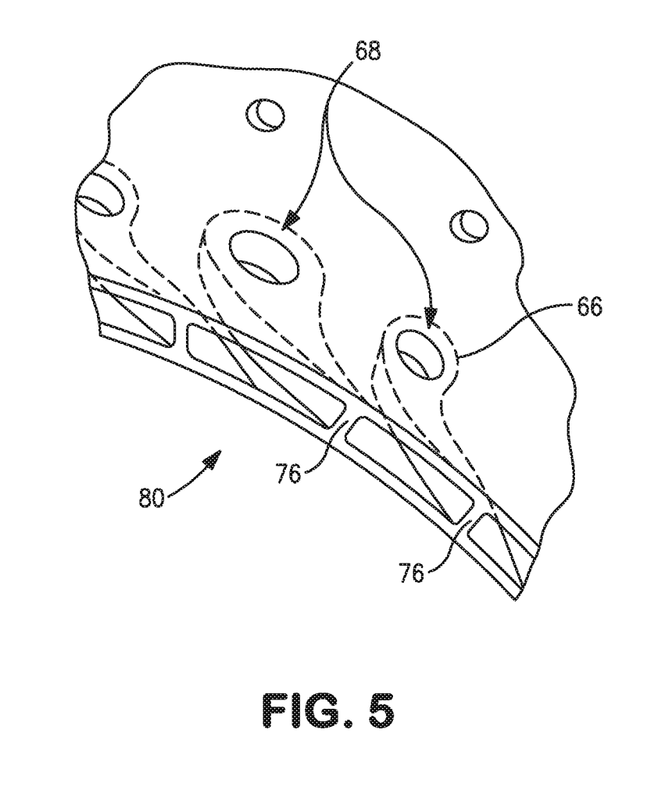
FIG. 5 is a partially broken perspective view of the TOBI from a cascade exit perspective.

With reference to FIG. 4, the bypass apertures 68 communicate, or bypass, airflow from the inner turbine rotor purge cavity 96 to the outer rim sealing cavity 94 such that the airflow does not cross the discharge air from the annular inlet 64 that is directed into the coverplate apertures 38. The bypass apertures 68 may be circular or otherwise shaped such as teardrop or oval to further accommodate and/or modify airflow therethrough. In one example, 20-40 bypass apertures 68 each of about 0.25 inches (6.25 mm) in diameter are provided.

This architecture minimizes or avoids the ejector effect of a conventional cascade exit. The cascade forms a nozzle that swirls and accelerates the cooling flow to match the rotational velocity of the rotor. The increase in momentum of this mass flow can entrain surrounding air, and pull it into the high velocity flow. Previously, the low momentum purge air P had to cross the plane of the cascade exit. The crossing purge flow P both inhibited the flow of the discharge air from the cascade exit and added to the mixing between the cooling flow C and purge flow P, which raised the temperature of the cooling air reaching the rotor, lowering the cooling air overall momentum, and thereby reducing cooling effectiveness.

The bypass apertures 68 essentially operate as vents through the cascade such that the purge mass flow can pass through the "solid walls" created by the cascade flowpath on-board injector 44, and satisfy the K/E mass flow requirements. Thus, the crossing flow is greatly reduced, the on-board injector cooling flow is provided to the rotor with less pollution, and a lower overall temperature results. In one example, the temperature is operational reduced by 4-5%. Lower blade cooling air temperature allows the rotor cooling flow to be reduced for a cycle improvement, a reduction in TSFC, and improved turbine efficiency.

It should be appreciated that in some cases there will be a contribution from the on-board injector 44 discharge flow to form the purge air P. If the turbine rotor cavity is effectively sealed off from the HPC discharge air, then the on-board injector 44 inlet mass flow at cavity 84 is about equal to the cooling flow C, the purge air P, the mass flow through the multiple of apertures 83 and the mass flow through aperture 92. Further, it may be desired that the mass flow through the multiple of apertures 83 is zero, while the purge air P and the mass flow through aperture 92 pass through the bypass apertures 68.

Figure 6:
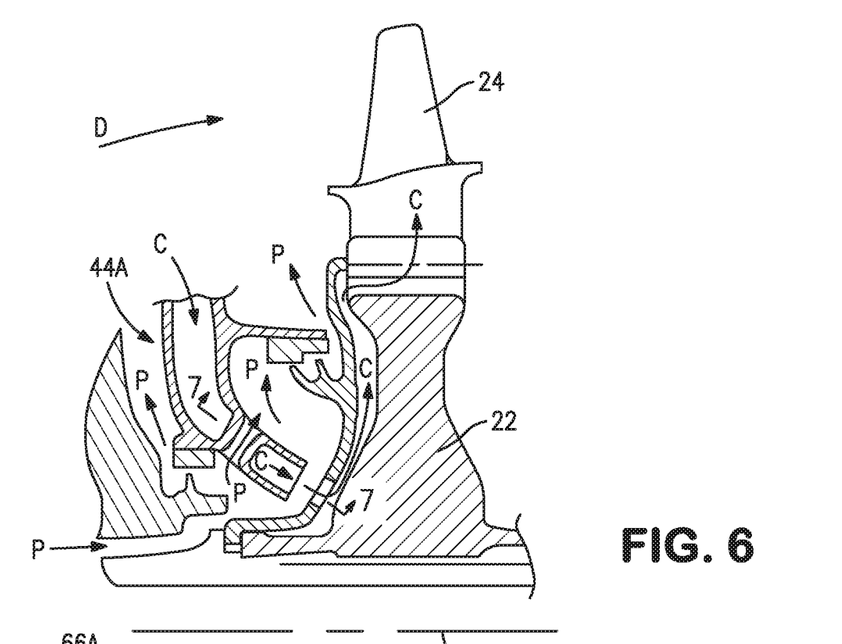
FIG. 6 is an enlarged axial cross section view of an angled on-board injector (AOBI) used to distribute discharge air for cooling the turbine.
Figure 7:
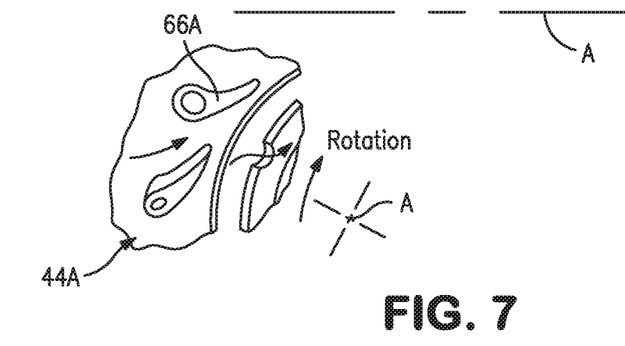
FIG. 7 is a sectional view of the AOBI taken along line 7-7 in FIG. 6.

With reference to FIG. 6, in another disclosed non-limiting embodiment, the on-board injector 44A is an angled on-board injector (AOBI). The on-board injector 44A is as described above but angled with respect to the engine longitudinal axis A (also shown in FIG. 7).

Figure 8:
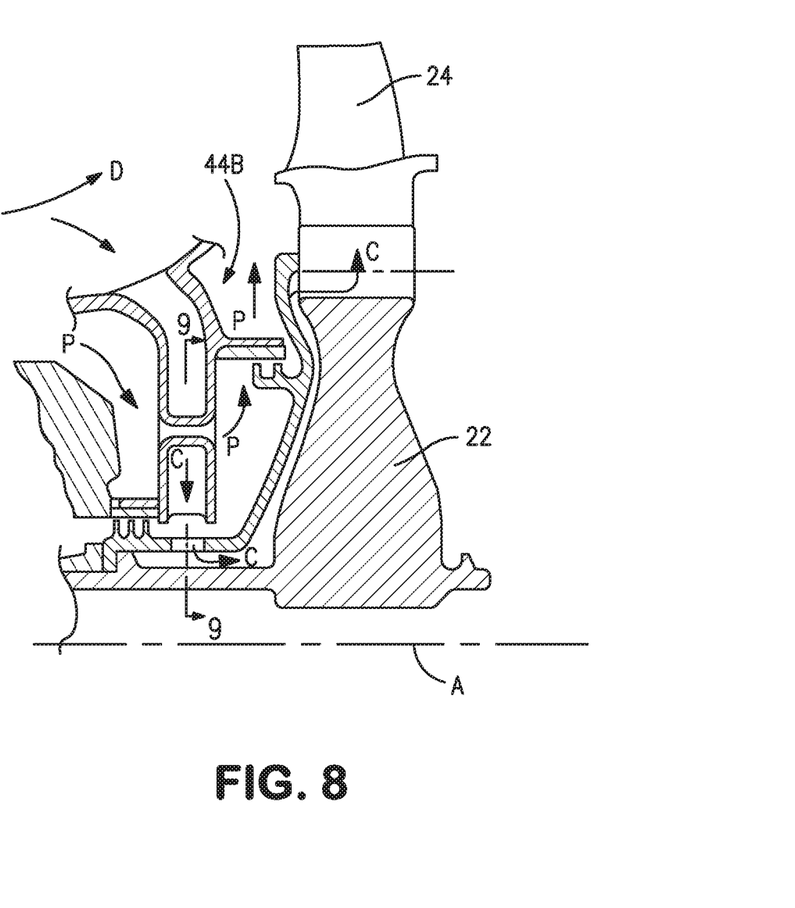
FIG. 8 is an enlarged axial cross section view of a radial on-board injector (ROBI) used to distribute discharge air for cooling the turbine.
Figure 9:
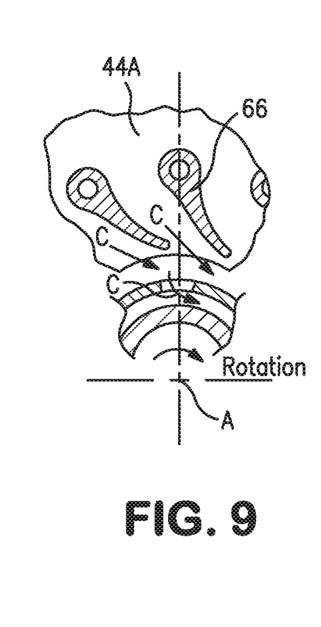
FIG. 9 is a sectional view of the ROBI taken along line 9-9 in FIG. 8.

With reference to FIG. 8, in another disclosed non-limiting embodiment, the on-board injector 44B is a radial on-board injector (ROBI). The on-board injector 44B is as described above but generally perpendicular to the engine longitudinal axis A (also shown in FIG. 9). It should be appreciated that other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward," "aft," "upper," "lower," "above," "below," and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of managing purge air within a turbo machine comprising the steps of:

segregating discharge air from an annular inlet with a multiple of airfoil shapes, the annular inlet defined around an engine longitudinal axis, the multiple of airfoil shapes operable to segregate and direct discharge air from the annular inlet toward a multiple of coverplate apertures; and directing purge air through a multiple of bypass apertures each along a radial axis transverse to the engine longitudinal axis and through the multiple of airfoil shapes, one of each of said multiple of apertures extends through one of said multiple of airfoil shapes.

2. The method according to claim 1, further comprising: tangentially directing the discharge air through a tangential on board injector.

3. The method according to claim 1, further comprising: directing the discharge air at an angle through an angled on board injector.

4. A system for a gas turbine engine comprising:
a coverplate for a turbine rotor defined about an engine longitudinal axis, said coverplate including a multiple of coverplate apertures; and
an on-board injector with a multiple of airfoil shapes between a first wall and a second wall to define an annular inlet about the engine longitudinal axis, said multiple of airfoil shapes operable to segregate and direct discharge air from the annular inlet toward said multiple of coverplate apertures, said on-board injector including a multiple of bypass apertures each along a radial axis transverse to the engine longitudinal axis, one of each of said multiple of apertures extends through one of said multiple of airfoil shapes, said first wall, and said second wall, wherein said on-board injector is a radial on board injector.

5. The system as recited in claim 4, wherein each of said multiple of airfoil shapes include a pressure side and a suction side, said pressure side in a rotational downstream position with respect to said coverplate about said engine axis.

6. A system for a gas turbine engine comprising:
a coverplate for a turbine rotor defined about an engine longitudinal axis, said coverplate including a multiple of coverplate apertures; and
an on-board injector with a multiple of airfoil shapes between a first wall and a second wall to define an annular inlet about the engine longitudinal axis, said multiple of airfoil shapes operable to segregate and direct discharge air from the annular inlet toward said multiple of coverplate apertures, said on-board injector including a multiple of bypass apertures each along a radial axis transverse to the engine longitudinal axis, one of each of said multiple of apertures extends through one of said multiple of airfoil shapes, said first wall, and said second wall, wherein said on-board injector is an angled on board injector.

7. The system as recited in claim 6, wherein each of said multiple of airfoil shapes include a pressure side and a suction side, said pressure side in a rotational downstream position with respect to said coverplate about said engine axis.

* * * * *